March 28, 1944.  R. A. DAILY ET AL  2,345,035
MANUFACTURE OF STORAGE BATTERIES
Filed July 21, 1943  2 Sheets-Sheet 1

INVENTORS
WILLIAM C. PRITCHARD
ROBERT A. DAILY
BY
their ATTORNEYS

March 28, 1944. R. A. DAILY ET AL 2,345,035
MANUFACTURE OF STORAGE BATTERIES
Filed July 21, 1943 2 Sheets-Sheet 2

100X
WOOD TREATED WITH $H_2SO_4$
CELLULOSE CARBONIZED

100X
WOOD TREATED WITH $H_2SO_4$
NOT CARBONIZED, CONSISTS OF
CELLULAR SUBSTANTIALLY PURE
CELLULOSE AND LIGNIN

INVENTORS
WILLIAM C. PRITCHARD
ROBERT A. DAILY
BY
their ATTORNEYS

UNITED STATES PATENT OFFICE 2,345,035

MANUFACTURE OF STORAGE BATTERIES

Robert A. Daily, Muncie, Ind., and William C. Pritchard, Lawton, Okla., assignors to General Motors Corporation, Detroit, Mich., a corporation of Delaware Application July 21, 1943, Serial No. 495,598

5 Claims. (Cl. 136—26)

This invention relates to the manufacture of storage batteries and more particularly to addition agents used in the plate paste of storage batteries for automotive use.

It is the aim and object of the present invention to improve the cold discharge rate of the storage battery. It will be understood by those skilled in this art that the cold discharge rate is a standard of comparison set up by the Society of Automotive Engineers. Cold discharge rate is the number of minutes which elapses when a charged battery at a temperature of 0° F. discharges 300 amperes before the voltage drops to one volt per cell.

A further object of the invention is to increase the cycling life of the storage battery.

This application is a continuation in part of Serial No. 281,108, filed June 26, 1939.

Figure 1:
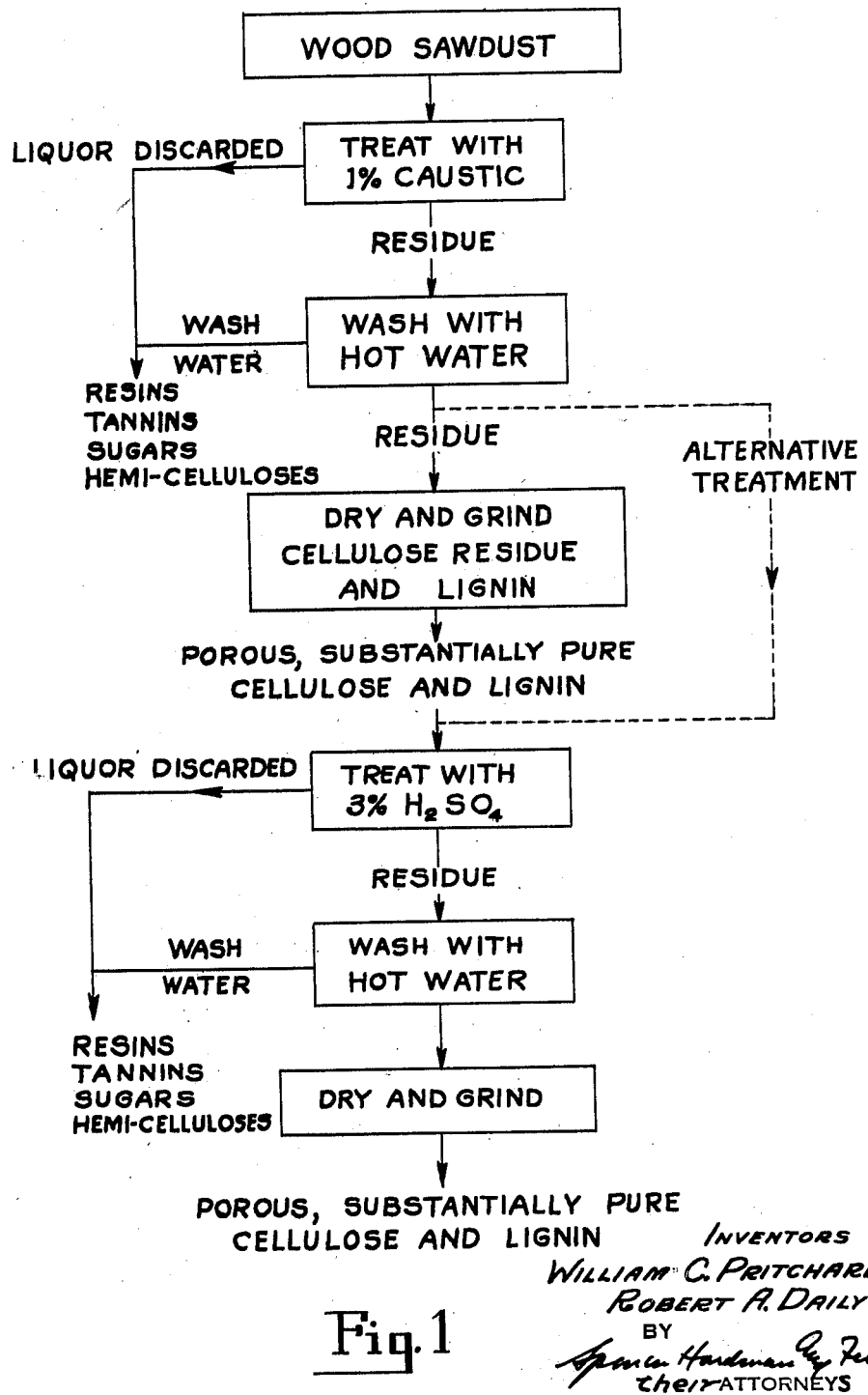
Fig. 1 is a flow chart of the process described herein.
Figure 2:
Fig. 2 is a photomicrograph at 100x of wood sawdust treated for four hours at room temperature in 72% sulphuric acid leaving a residue of lignin and carbonized cellulose.
Figure 3:
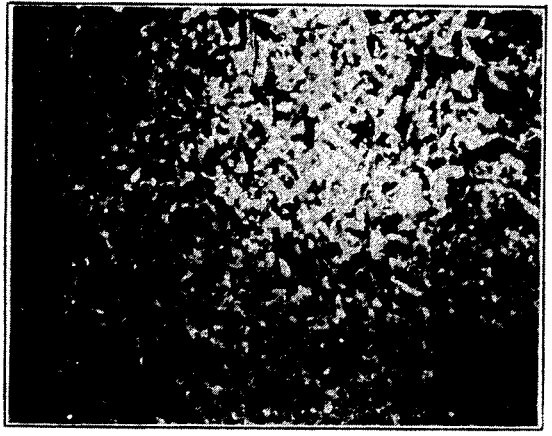
Fig. 3 is a photomicrograph at 100x of similar wood sawdust treated in accordance with this invention wherein the lignocellulose is uncharred and porous in nature.

We propose to use in combination with primary expanders or addition agents, a secondary expander which we make by treating particles of wood such as sawdust for example. We treat sawdust with caustic, preferably a one percent solution of sodium hydroxide at room temperature for an overnight treatment of around 12 hours. Then the sawdust is removed from the caustic solution and is hot washed in order to keep the pores open, and to way away the caustic and the matter dissolved out of the wood. This caustic treatment removes soluble materials such as resins, tannins, sugars and other carbohydrates to the extent of about 25% of the original amount of the wood but does not react upon the lignin or the cellulose in the wood in any way. Thus, the resulting material is substantially pure porous cellulosic material with some lignin present. This material may be dried and ground and mixed in small quantities with the negative paste. It will have a beneficial result in combination with a suitable primary expander in improving the cold discharge rate and the life of the battery.

We prefer, however, to follow the caustic treatment immediately with an acid treatment. In this treatment the caustic treated sawdust is next placed in a 3% solution of dilute sulphuric acid which is boiled for 6 hours. Then the treated material is removed from the acid solution and is again washed with hot water which keeps the pores of the material open while washing out the acid and matter dissolved out of the wood by the acid. The acid treatment effects a still further removal of the soluble materials such as resins, tannins, sugars, other carbohydrates and hemi-celluloses to the extent of about 20% of the original amount of the wood. Thus the acid treatment combined with a caustic treatment removes essentially all of the resins, tannins, sugars and carbohydrates such as hemi-celluloses present in the untreated sawdust. The structure is even more porous and open following the acid treatment than it was following the caustic treatment. This acid treatment is so controlled that the lignocellulose is not charred or dissolved in any way. Thus the combined caustic and acid treatment dissolve away about 45% by weight of the original amount of the wood, which leaves only the substantially pure lignocellulose. The lignocellulose due to the dissolving or hydrolyzing action of the reagents is now cellular in structure, such porosity being occasioned by the dissolution and removal of soluble materials normally held in its pores.

The material is then dried and ground to produce a flour of tan or buff color. This material is mixed with the negative paste preferably in the proportion of about .6% of the total weight of the batch. Although additions of from .2% to 1% yield improved results.

It is believed that this material does not produce any effect immediately upon the active material of the negative plate; but that, during the cycling of the battery, a physical expansion of the active material of the negative plate takes place. Probably this physical expansion does not begin to take place until after about 10 cycles of battery operation. The improvement in cold discharge rate begins to be noticeable after 50 to 100 cycles and the improvement is distinctly pronounced at 200 cycles. It has been found that a certain type of battery which was made without this expander began to show a poor discharge rate after 234 cycles and that the same type of battery made with this expander lasted for 500 cycles and showed a good cold discharge rate at 450 cycles.

The effect of this new secondary expander on cold discharge rate is shown by the following tests on batteries made with negative plates pasted with a paste including the usual mixture of yellow and red litharge and commercial waste sulphite liquid as the primary addition agent. In the following tabulation, the figures in the tables indicate the number of minutes which elapses when a charged battery at a temperature of 0° F. discharges 300 amperes before the voltage drops to one volt per cell.

Negative plate pasted with litharge mixed with waste sulphite liquor and treated red oak sawdust:

| | Cycles | Minutes | | Cycles | Minutes |
|---|---|---|---|---|---|
| Caustic treatment only of red oak sawdust | 0 | 2.9 | Caustic and acid treatments | 0 | 3.7 |
| | 52 | 3.9 | | 47 | 2.9 |
| | 95 | 4.1 | | 97 | 3.4 |
| | 154 | 3.3 | | 147 | 3.2 |
| | 204 | 3.4 | | 197 | 4.0 |
| | | | | 243 | 3.4 |

A battery with negative plates pasted with litharge and waste sulphite liquor no secondary expander being used:

| Cycles | Minutes |
|---|---|
| 0 | 3.0 |
| 52 | 3.9 |
| 95 | 3.7 |
| 154 | 2.9 |
| 204 | 2.5 |

These tests show that the secondary expander substantially improves cold discharge after approximately 150 cycles.

Other primary expanders or addition agents with which our new secondary expander will work successfully are substantially pure lignosulphonic acid, nickel salts of sulphonated lignin, etc.

The secondary expander as herein described is vastly different from such materials as the carbonized sawdust or carbon and lignin of the prior art. In our process, due to the concentration of the reagents, the cellulose in the wood residue is not charred or dissolved but remains in its original form wherein the soluble resins, tannins, sugars and hemi-celluloses have been substantially removed to leave only honeycombed particles of high porosity and of substantially pure lignocellulose. This new material yields entirely different results and in fact its function is different than the well known carbonaceous materials such as lamp black and carbonized wood flour. These prior art materials act as diluents and when fibrous in nature aid in holding the paste on the plate. This new material actually functions as an expander and also aids in the retardation of the crystal growth of the lead particles. The combination of any of the aforementioned primary addition agents with this secondary addition agent yields greatly improved results over the results obtained by the use of either agent alone.

While hardwood is preferred, soft or coniferous woods, which when treated as set forth yield honeycombed substantially pure lignocellulosic particles, can also be used as starting ingredients.

Since cellulose is the principal ingredient of wood, the final product after treatment is substantially pure lignocellulose, since it contains only relatively small quantities of soluble ingredients such as resins, tannins, hemi-celluloses and sugars. It is to be understood that the lignocellulose in its highly porous form is the desirable material. The other materials remaining therein being in such small amounts do not affect the function of the lignocellulose and since their complete removal adds unnecessary expense they are allowed to remain.

From the foregoing it is manifest that the caustic treatment alone is partially effective but that the caustic plus acid treatment yields best results. Also it has been found that the order of treatment is important, and if reversed, gives inferior results.

The lignocellulose need not be highly absorptive, that is highly porous, to be a good secondary expander. The absorptive qualities of the cellulose are preferred since the highly porous lignocellulose reduces the "drop weight" of the paste (specific density). The specific treatment as set forth heretofore yields a higher porous lignocellulose. The treatment heretofore set forth may be varied to hasten the final result however the porosity is not as great, although sufficient to yield beneficial results when the material is used as a secondary expander. In this instance, the caustic solution can be as high as a 10% solution if kept cold and the acid treatment may be carried out in as high as a 35% solution if the solution is kept at room temperature. However, in these cases, the control is critical and if the solutions are heated, the results are not usually satisfactory. In other words, the higher the percentage of the solutions used the less time and the lower temperature is required for treatment. On the other hand the low percentage solutions as previously described are easier to control although a greater time is required. In all cases it is imperative that the control of the process be such that a balance between strength of leaching solutions, temperature of the solutions and period of treatment is reached so that only the undesirable soluble constituents in wood (tannins, sugars, resins, hemi-celluloses, etc.) are removed and at no time should the control of these variables be such that the cellulose is dissolved, charred, or in any way changed in nature. This is a most important factor, the entire success of the material depends on the presence of porous lignocellulose, per se, any carbonaceous material due to leaching with control conditions that permit carbonizing of the cellulose is undesirable and destroys the beneficial action of the addition agent. Likewise, when control conditions are such as to permit any appreciable quantity of the soluble materials to remain in the lignocellulose, the beneficial action of the addition agent is greatly impaired or destroyed. The control conditions are highly critical and must necessarily be carefully maintained and checked in order to obtain a satisfactory product.

The addition agent of substantially pure lignocellulose whether or not used in connection with the primary expander maintains the life of the plate and gives a higher capacity to the plate after a certain number of cycles but it is to be understood in the preferred form the expander is used in connection with a primary expander. The lignin present in the lignocellulose addition agent is believed to act as a protective agent which renders the cellulose more resistant to the battery acid.

While the embodiment of the present invention as herein disclosed, constitutes a preferred form, it is to be understood that other forms might be adopted, all coming within the scope of the claims which follow.

What is claimed is as follows:

1. A method of making an addition agent for a plate paste for lead storage batteries comprising the steps of: treating wood sawdust with a caustic solution having a concentration ranging from one to 10% and at a temperature corresponding to room temperature for removing a portion of the soluble tannins, resins, sugars and hemicelluloses only therein, treating the residue with a solution of sulphuric acid having a concentration ranging from 3% to 35% at a temperature of from the boiling point of the solution to room temperature respectively to further remove said tannins, resins, sugars and hemicelluloses, each of said treating steps being carried out under controlled conditions of time so as to leave the cellulose unaffected and in a cellular and uncharred condition, and then drying and grinding the residue which consists of porous, substantially pure lignocellulose.

2. A method of making an addition agent for plate paste for lead storage batteries comprising the steps of: treating wood sawdust at room temperature with a 1% caustic solution for a period in the neighborhood of 12 hours for removing a portion of the soluble tannins, resins, sugars and hemicelluloses only therein, boiling the residue within a 3% solution of sulphuric acid for a period of in the neighborhood of six hours to further remove said tannins, resins, sugars and hemicelluloses, and then grinding the residue which consists of porous, substantially pure uncharred lignocelluloses.

3. A method of making an addition agent for plate paste for lead storage batteries, comprising the steps of: leaching wood in comminuted form at room temperature in a caustic solution having a concentration between 1% and 10% for removing a portion only of soluble constituents therein and without in any way affecting the cellulose portion thereof, washing the leached residue, further leaching the washed residue in sulphuric acid solution having a concentration of between 3% and 35% and ranging in temperature from the boiling point of the solution to room temperature, said two leaching steps being carried out for a time sufficient to substantially remove the soluble portion of the wood without charring or affecting the cellulose, and then grinding the residue which consists of substantially pure, highly cellular, uncharred lignocellulose.

4. An expander for addition to the negative plate paste for use in a Faure type storage battery plate consisting of comminuted, cellular, substantially pure uncondensed cellulose with some lignin, said addition agent being made from wood sawdust that has been leached at room temperature with a caustic solution ranging in concentration from 1% to 10% and then leaching with sulphuric acid solution in concentrations of from 3% to 35% and at temperatures ranging from the boiling point of the solution to room temperature respectively.

5. An expander for addition to the negative plate paste for use in Faure type storage batteries, consisting of comminuted, cellular, substantially pure uncondensed cellulose with some lignin, said addition agent being made from wood sawdust, leached at room temperature with a 1% caustic solution for a period of in the neighborhood of 12 hours and then leached with a 3% sulphuric acid solution by boiling in the solution for a time in the neighborhood of six hours.

ROBERT A. DAILY.
WILLIAM C. PRITCHARD.